United States Patent
Marra et al.

(10) Patent No.: US 10,643,148 B2
(45) Date of Patent: May 5, 2020

(54) RANKING OF NEWS FEED IN A MOBILE DEVICE BASED ON LOCAL SIGNALS

(71) Applicant: Facebook, Inc., Menlo Park, CA (US)

(72) Inventors: Christopher John Marra, San Francisco, CA (US); Alexander A. Sourov, Seattle, WA (US); Alexandru Petrescu, Shoreline, WA (US); Syed Shahbaz Ahmed, Redmond, WA (US); Lars Seren Backstrom, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 639 days.

(21) Appl. No.: 15/171,122

(22) Filed: Jun. 2, 2016

(65) Prior Publication Data

US 2017/0351675 A1 Dec. 7, 2017

(51) Int. Cl.
*G06N 20/00* (2019.01)
*G06F 3/14* (2006.01)
*G06F 16/9535* (2019.01)

(52) U.S. Cl.
CPC ............ *G06N 20/00* (2019.01); *G06F 3/14* (2013.01); *G06F 16/9535* (2019.01); *G09G 2350/00* (2013.01); *G09G 2370/022* (2013.01); *G09G 2370/20* (2013.01)

(58) Field of Classification Search
CPC .......... G06N 99/005; G06N 20/00; G06F 17/30867; G06F 16/9535; G06F 17/3053; G06F 17/30554
See application file for complete search history.

(56) References Cited

U.S. PATENT DOCUMENTS

| | | | |
|---|---|---|---|
| 2002/0010780 A1* | 1/2002 | Wong | G06F 17/30902 709/226 |
| 2011/0004600 A1* | 1/2011 | Walker | H04L 67/1095 707/748 |
| 2013/0031034 A1* | 1/2013 | Gubin | G06Q 10/06393 706/12 |
| 2013/0070948 A1* | 3/2013 | Lee | H04M 1/04 381/334 |

(Continued)

OTHER PUBLICATIONS

Yao et al., "Improving QoS in High-Speed Mobility Using Bandwidth Maps", Apr. 2012, IEEE Transactions on Mobile Computing, vol. 11, No. 4, pp. 603-617 (Year: 2012).*

(Continued)

*Primary Examiner* — Alan Chen
*Assistant Examiner* — Brent Johnston Hoover
(74) *Attorney, Agent, or Firm* — Fenwick & West LLP

(57) ABSTRACT

A mobile device receives ranked news feed stories from a server of a social networking system. The mobile device determines whether to adjust the ranking based on local information generated by applications executing on the mobile device or hardware of the mobile device. Examples of local information of the mobile device include information describing the mobile devices' network connection, geographical location, sensor readings, downloaded data on memory storage, and interactions of software applications executing on the mobile device. For example, if a network co-processor of a mobile device detects a slow network connection, the mobile device lowers the ranking of news feed stories expected to require further use of network bandwidth.

19 Claims, 8 Drawing Sheets

(56) References Cited

U.S. PATENT DOCUMENTS

| | | | | |
|---|---|---|---|---|
| 2013/0290223 A1* | 10/2013 | Chapelle | ............... | G06N 20/00 |
| | | | | 706/12 |
| 2013/0295964 A1* | 11/2013 | Kang | ................... | H04W 4/043 |
| | | | | 455/456.3 |
| 2014/0096062 A1* | 4/2014 | Luu | ........................ | H04L 51/32 |
| | | | | 715/774 |
| 2014/0189539 A1* | 7/2014 | St. Clair | ................ | G06F 3/048 |
| | | | | 715/753 |
| 2017/0024660 A1* | 1/2017 | Chen | ................... | G06N 99/005 |

OTHER PUBLICATIONS

Bao et al., "GeoFeed: ALocation-Aware News Feed System", Apr. 1-5, 2012, 2012 IEEE 28th International Conference on Data Engineering, pp. 54-65 (Year: 2012).*

Otebolaku et al., "Context-aware media recommendations for smart devices", May 16, 2014, Journal of Ambient Intelligence and Humanized Computing, vol. 6, Issue 1, pp. 13-36 (Year: 2014).*

Zhao et al., "O2SM: Enabling Efficient Offline Access to Online Social Media and Social Networks", 2013, Middleware 2013, pp. 445-465 (Year: 2013).*

Devlic et al., "Energy consumption reduction via context-aware mobile video pre-fetching", Feb. 1, 2013, 2012 IEEE International Symposium on Multimedia, pp. 261-265 (Year: 2013).*

* cited by examiner

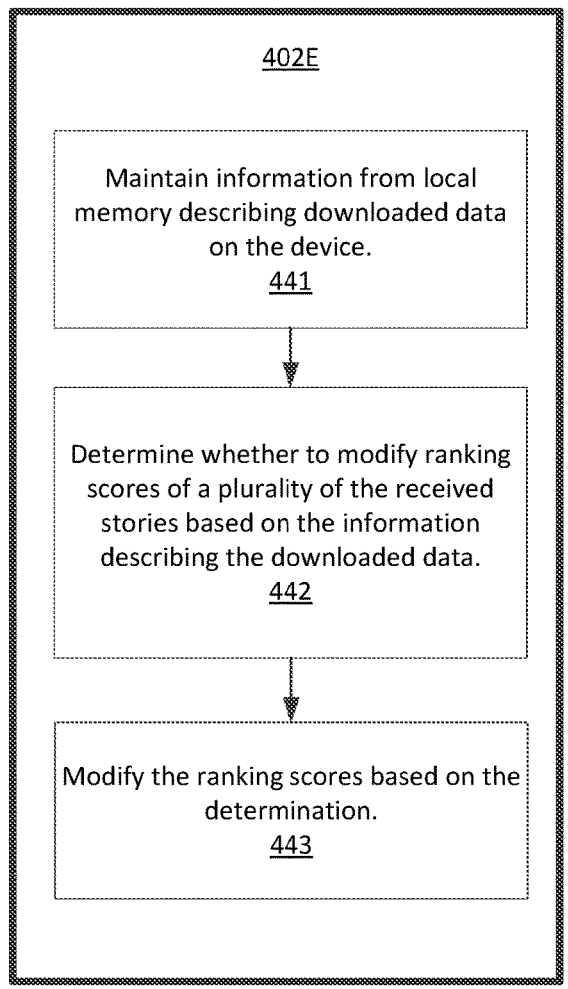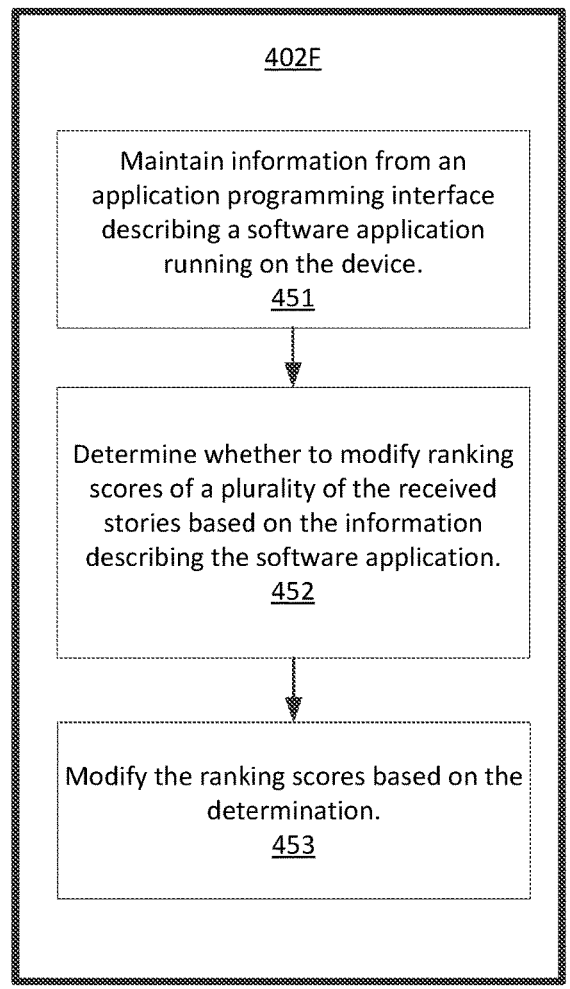
FIG. 4E
FIG. 4F

US 10,643,148 B2

RANKING OF NEWS FEED IN A MOBILE DEVICE BASED ON LOCAL SIGNALS

BACKGROUND

This invention relates to news feeds in social networking systems and in particular to ranking news feed stories based on information from hardware of a mobile device, for example, a speed of a network connection detected by the mobile device.

A social networking system typically has access to large amounts of information describing actions performed by users that may be of interest to other users of the social networking system. A user is likely to be interested in learning about actions performed by other users connected to the user in the social networking system. These actions include photo and video uploads, status updates, transactions, wall posts, posting of comments, recommendations, likes indicated on other users' photos, videos, and the like. The social networking system stores other types of information that is likely to be of interest to the user, for example, activities related to social groups or events represented in the social networking system. The social networking system presents social information as news feed stories, also referred to herein as stories.

Users view stories on their news feeds displayed on client devices and often access content from social networking systems via mobile devices. If a client device has a reliable network connection, then new unread stories will be promptly downloaded to the device. However, if the device has a weak network connection, the user may not have access to all stories on the device. Conventional techniques do not provide satisfactory experiences to users with client devices with weak network connections because users do not have access to their newsfeed at all times. A social networking system that presents stories at all times to each user is more likely to ensure that users are loyal to the social networking system and visit it on a regular basis.

SUMMARY

Embodiments of the invention rank news feed stories presented via a mobile device of a user of a social networking system based on local signals generated by the mobile device, for example, information generated by hardware of the mobile device. The system executing on a user's mobile device receives news feed stories with ranking scores from a social networking system. The system also receives local signals generated by the mobile device, for example, information generated by applications executing on the device or by hardware of the device. The local signals may be generated by the device's hardware and describe information associated with mobile device, for example, status of network connection of the mobile device, geographical location, sensor readings, downloaded data on memory storage, as well as software applications. The system modifies the ranking scores of the news feed stories based on the local signals before presentation on the mobile device. For example, the system may receive an indication of slow network connection from a network coprocessor of the mobile device. Based on the received information, the system reduces the ranking score of one or more news feed stories that require download of large content items. As a result, the system may re-rank stories with text-only content higher than stories with multimedia content items such as photos and videos.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a diagram of a system environment for presenting news feed stories to users of a social networking system according to one embodiment.

FIG. 4E is a flowchart of the process of ranking news feed stories based on memory storage information of a mobile device according to one embodiment.

FIG. 4F is a flowchart of the process of ranking news feed stories based on software application information of a mobile device according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
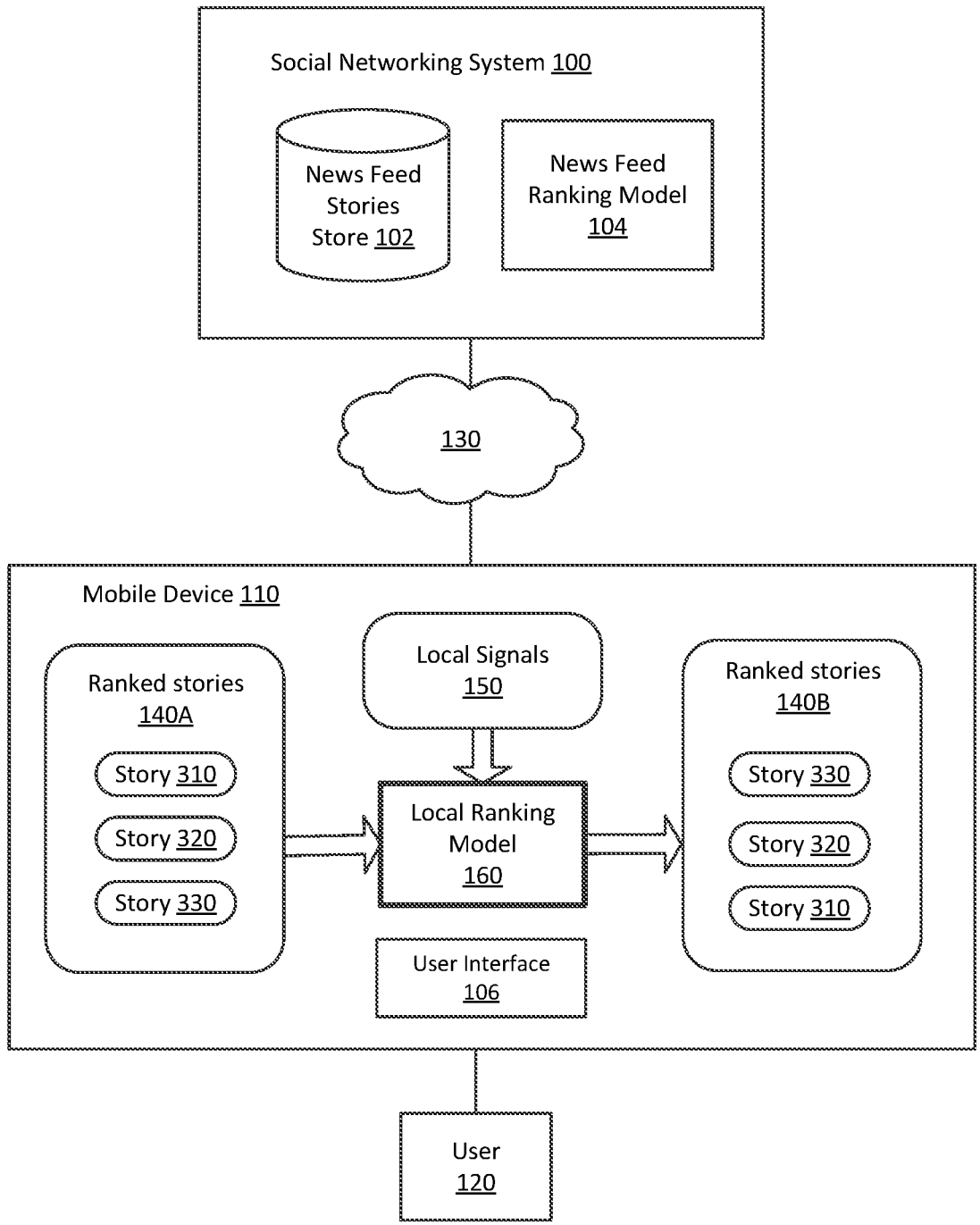

FIG. 1 is a diagram of a system environment for presenting news feed stories to users of a social networking system 100 according to one embodiment. A user 120 interacts with the social networking system 100 via a user interface 106 of a mobile device 110 connected to the system 100 through the network 130. Some embodiments of the system 100 have different and/or other modules than the ones described herein and have more than one mobile device 110 and corresponding user 120. The functions can be distributed among the modules in a different manner than described in FIG. 1.

Figure 2A:
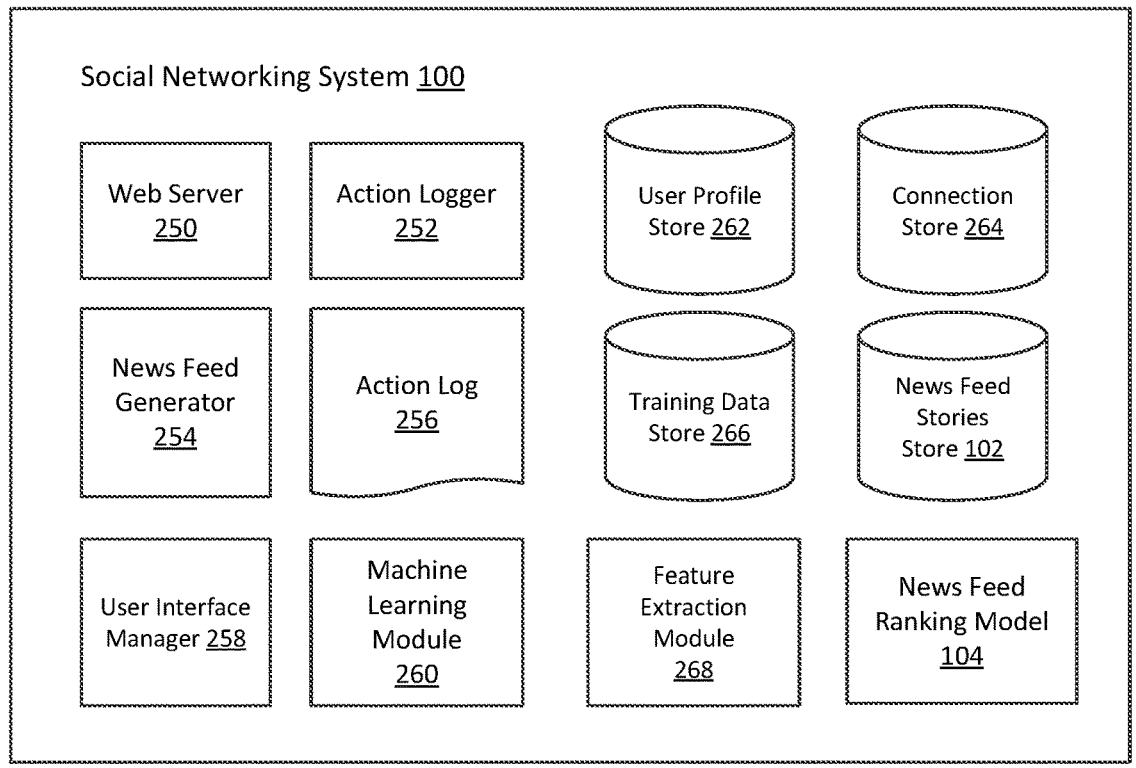
FIG. 2A is a diagram of the system architecture of a social networking system within the environment of FIG. 1 according to one embodiment.

In one embodiment, the social networking system 100 comprises a news feed stories store 102 and a news feed ranking model 104, and is further described in FIG. 2A. The mobile device 110 comprises a first set of ranked stories 140A, a second set of ranked stories 140B, local signals 150, and a local ranking model 160, and is further described in FIG. 2B. In one example, the mobile device 110 receives the first set of ranked stories 140A ranked by the news feed ranking model 104 comprising, in order, story 310, story 320, and story 330, from the system 100. The local ranking model 160 takes the ranked stories 140A and local signals 150 describing information from the mobile device 110 as inputs and modifies the ranking of the three stories in the ranked stories 140A based on the local signals 150. Local signals 150 include information generated by applications executing on the mobile device 110 or by hardware of the mobile device 110. Then the local ranking model 160 outputs the second set of ranked stories 140B, comprising the same three stories in the ranked stories 140A, but in a different order, i.e., story 330, story 320, and story 310, as further described in FIG. 3A and FIG. 3B.

The social networking system 100 offers its users the ability to communicate and interact with other users of the social networking system 100. Users join the social networking system 100 and then add connections to a number of other users of the social networking system 100 to whom they desire to be connected. As used herein, the term "friend" refers to any other user to whom a user has formed a connection, association, or relationship via the social networking system 100. The term friend need not require the users to actually be friends in real life, (which would generally be the case when one of the members is a business or other entity); it simply implies a connection in the social networking system 100.

The interactions between mobile devices 110 and the social networking system 100 are typically performed via a network 130, for example, via the internet. The network 130 enables communications between the device 110 and the social networking system 100. In one embodiment, the network 130 uses standard communications technologies and/or protocols. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Social Networking System Architecture

FIG. 2A is a diagram of the system architecture of a social networking system 100 within the environment of FIG. 1 according to one embodiment. The social networking system 100 includes a news feed ranking model 104, news feed stories store 102, web server 250, action logger 252, news feed generator 254, action log 256, user interface manager 258, machine learning module 260, user profile store 262, connection store 264, training data store 266, and feature extraction module 268. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The user interface manager 258 allows users 120 of the social networking system 100 to interact with the social networking system 100 and presents social information of interest to a user 120 including news feed stories from the news feed stories store 102. The news feed ranking module 104 ranks stories of interest to each user 120 and presents the stories in order of the ranking. In an embodiment, the news feed ranking model 104 is a machine learning model.

The social networking system 100 allows users to communicate or otherwise interact with each other and access content. The social networking system 100 stores user profile objects in the user profile store 262. The information stored in user profile store 262 describes the users of the social networking system 100, including biographic, demographic, and other types of descriptive information, such as age, work experience, educational history, interests, gender, sexual preferences, hobbies or preferences, location, income, languages spoken, ethnic background, and the like. Information describing a user may be explicitly provided by a user or may be inferred from actions of the user. For example, interests of a user can be inferred from the type of content accessed by the user. The user profile store 262 may store other types of information provided by the user, for example, images, videos, documents, likes indicated by the user, comments, status updates, recommendations of images, videos, or uniform resource locator (URL) links, and the likes. Images of users may be tagged with the identification information of the appropriate users displayed in an image.

The connection store 264 stores data describing the connections between different users of the social networking system 100. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking system 100 based on common characteristics of the users (e.g., users who are alumni of the same educational institution). Connections in social networking system 100 are usually in both directions, but need not be, so the terms "connection" and "friend" depend on the frame of reference. For example, if Dean and Woodie are both connected to each other in the social networking system 100, Dean and Woodie, both users, are also each other's friends. The connection between users may be a direct connection; however, some embodiments of a social networking system 100 allow the connection to be indirect via one or more levels of connections. Connections may also be established between different types of entities for example, the social networking system 100 can have an object representing a school and users of the social networking system 100 that study in the school or who are alumni of the school can connect with the school in the social networking system 100.

The web server 250 links the social networking system 100 via the network 130 to one or more mobile devices 110. The web server 250 serves web pages, as well as other web-related content, such as Flash, XML, and so forth. The web server 250 provides the functionality of receiving and routing messages between the social networking system 100 and the devices 110 as well as other external systems. These messages can be instant messages, queued messages (e.g., email), text and SMS (short message service) messages, or any other suitable messaging technique. In some embodiments, a message sent by a user to another can be viewed by other users of the social networking system 100, for example, by the connections of the user receiving the message. An example of a type of message that can be viewed by other users of the social networking system 100 besides the recipient of the message is a wall post.

The action logger 252 is capable of receiving communications from the web server 250 about user actions on and/or off the social networking system 100. The action logger 252 populates the action log 256 with information about user actions to track them. When a user 120 performs an action using the social networking system 100, action logger 252 adds an entry for that action to the action log 256. Any action that a particular user takes with respect to another user is associated with each user's profile, through information maintained in a database or other data repository, such as the action log 256. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well.

The news feed generator 254 generates news feed stories for presentation to users 120 of the social networking system 100. The user to whom a story is presented is referred to as a viewer of the story. In an embodiment, the news feed generator 254 analyzes information stored in the action log 256 to identify information useful for generating news feed stories. The news feed generator 254 identifies actions stored in the action log 256 that are likely to be of interest to viewers and extracts information describing these actions from the action log 256 to generate stories. In some embodiments, the news feed generator 254 obtains information describing actions from other modules, for example, from the action logger 252, the user interface manager 258, or other run time modules that implement functionality for performing different types of actions. For example, if a user uploads an image to the social networking system 100, the module executing the code for uploading the image informs the news feed generator 254 of the action so that the news feed generator 254 can generate a news feed story describing the action.

The news feed generator 254 may determine that certain actions are not likely to be of interest to users for reporting as stories. For example, a user hiding a comment posted by another user or a user changing certain types of user preferences may not be of interest to other users and is therefore not reported in stories. However, other changes made by a user to the user's profile may be considered interesting for other users, for example, a change in relationship status of a user.

The news feed generator 254 may not generate news feed stories based on certain actions as a matter of policies enforced by the social networking system 100. For example, a user viewing user profile of another user or a user sending a private message to another user may not be presented as stories due to privacy concerns. Furthermore, the news feed generator 254 may consider privacy settings of individual users to determine whether certain actions of a user can be presented as stories to other users. A user may set the user's privacy settings to limit the set of people to whom stories describing the user's actions may be sent. For example, a user may allow only connections of the user to receive information describing the users' actions, whereas another user may allow connections of the user's connections to receive the information. A user may restrict the types of actions that are reported as stories. For example, the user may specify that certain actions, for example, adding a new connection may not be reported as a story.

In an embodiment, the news feed generator 254 stores the news feed stories generated in the news feed stories store 102. The news feed store 102 may be represented as a database that links various objects related to the stories. Each story stored in the news feed store 102 can be associated with other entities in the social networking system 100. For example, a news feed story may be associated with one or more users that performed an action described in the story in the social networking system 100. The users who performed the actions described in the news feed story are called the actors. For example, if the story describes a comment posted by Dean on a video posted by Woodie, both Dean and Woodie can be considered actors of the story. As another example, a story describing a comment posted by a user in response to another user's wall post may be associated with both the user who posted the message on the wall and the user who posted the comment.

The news feed ranking model 104, determines the news feed stories to be presented to a user and provides the stories selected for presentation to the user interface manager 258. The user interface manager 258 presents the selected news feed stories to the user interface 106 on a mobile device 110. The news feed ranking model 104 determines a set of stories for presentation to a viewer based on associations between the stories and the viewer. These associations are determined on various factors including, whether the story describes a user of the social networking system that is connected to the user, whether the viewer previously accessed information describing an entity represented in the social networking system that is described in the story, whether the viewer interacted with another story that is related to the current story, and the like. The news feed ranking model 104 may determine a subset of the stories based on the rank, for example, the top ten stories, depending on the display area available on the user interface 106 of the device 110 for presenting the stories. The news feed ranking model 104 presents the stories in the order determined by the ranking, for example, stories ranked higher may be presented more prominently compared to stories ranked lower. In an embodiment, the stories ranked higher are presented above the stories ranked lower. In other embodiments, stories ranked higher may be presented more prominently by displaying them using an appropriate text color, font, text size, back ground color, etc.

The machine learning module 260 uses machine learning techniques to generate the news feed ranking model 104. In an embodiment, the machine learning module 260 may generate a portion of the functionality invoked by the news feed ranking model 104. For example, the machine learning module 260 may generate a model that determines a ranking score associated with a given news feed story. The news feed ranking model 104 can order a set of stories based on the ranking scores of each story.

The machine learning module 260 may generate a model based on optimization of different types of ranking models, including but not limited to algorithms that analyze every story separately, pairs of stories, or sets of stories. For example, the machine learning module 260 may generate a classifier saved in the training data store 266, that takes as input a pair of news feed stories for a given user and returns true if the first news feed story ranks higher than the second news feed story for reporting to the user and false otherwise. The news feed ranking model 104 can use the output of the generated classifier to rank a given set of news feed stories by doing pair wise comparisons of the ranking scores of the stories. Other embodiments can use other machine learning techniques for ranking news feed stories, for example, tree-based models, kernel methods, neural networks, splines, or an ensemble of one or more of these techniques.

The feature extraction module 268 extracts various features of the users of the social networking system 100 and features of the news feed stories that are used as input for the news feed ranking model 104. These features characterize the users and the news feed stories respectively. The feature extraction module 268 stores the extracted features in the training data store 266. The feature extraction module 268 may run in a batch mode to process data stored in the training data store 266, action log 256, user profile store 262, and connection store 264. The news feed ranking model 104 can extract information from the feature store 268 to rank stories for presentation to users. Alternatively, the feature extraction module 268 may extract the features on a need basis upon invocation by the news feed ranking model 104. This ensures that the news feed ranking model 104 is provided with the recent most information. The feature extraction module 268 however stores the extracted features in the training data store 266 to ensure that the effort of extracting the features is not duplicated. For example, the feature extraction module 268 may store a time stamp along with the features to determine when the information was generated and whether it needs to be regenerated or not.

In some embodiments, the system 100 is not a social networking system but a system that communicates with a social networking system to obtain the necessary social network information. The system 100 may communicate with the social networking system, for example, using application programming interfaces (APIs) provided by the social networking system. In these embodiments, some modules shown in FIG. 2A may run in the system 100, whereas other modules may run in the remote social networking system. For example, the modules including the news feed ranking model 104 may run in the system 100 but modules training data store 266, user profile store 262, connection store 264, and action log 256 may exist in a separate social networking system.

Client Device System Architecture

Figure 2B:
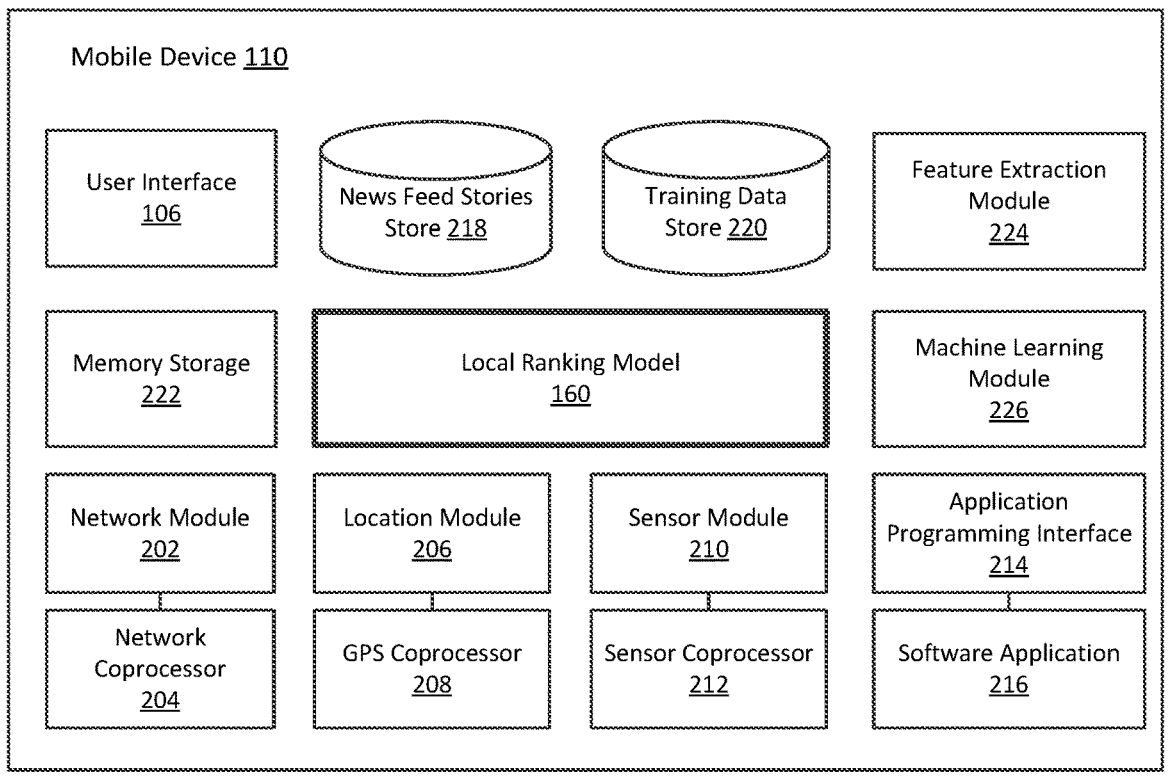
FIG. 2B is a diagram of the system architecture of a mobile device within the environment of FIG. 1 according to one embodiment.

FIG. 2B is a diagram of the system architecture of a mobile device 110 within the environment of FIG. 1 according to one embodiment. The mobile device 110 includes a user interface 106, local ranking model 160, network module 202, network coprocessor 204, location module 206, GPS (i.e., global positioning system) coprocessor 208, sensor module 210, sensor coprocessor 212, application programming interface (API) 214, software application 216, news feed stories store 218, training data store 220, memory storage 222, feature extraction module 224, and machine learning module 226. In other embodiments, the mobile device 110 may include additional, fewer, or different modules, coprocessors, stores, APIs, and/or software applications for various applications. Conventional components such as network interfaces, security mechanisms, and the like are not shown so as to not obscure the details of the system.

The mobile device 110 used by a user 120 for interacting with the social networking system 100 over the network 130 can be a smartphone, personal digital assistant (PDA), mobile telephone, a tablet PC, laptop computer, or notebook. In another embodiment, the mobile device 110 can be any device having computer functionality such as a desktop computer. The mobile device 110 executes a user interface 106 to allow the user 120 to interact with the social networking system 100. The user interface 106 allows the user to perform various actions associated with the social networking system 100 and view information provided by the social networking system 100. The actions performed using the user interface 106 include viewing stories, adding connections, posting messages, uploading images or videos, updating the user's profile, and the like. The information provided by the social networking system 100 that can be viewed using the user interface 106 includes stories, images or videos posted by the user's connections, comments posted by the user's connections, messages sent to the user by other users, or wall posts. In an embodiment, the user interface 106 is presented to the user via a browser application that allows a user to retrieve and present information from the internet or from a private network.

In one embodiment, the network coprocessor 204 is a computer hardware processor that maintains information about the network connections (e.g., using standard communications technologies and/or protocols such as WiFi, LTE, BLUETOOTH®, etc.) of the mobile device 110. The information may describe the speed of a network connection (e.g., the duration of time required to download a story), the status of a network connection (e.g., whether or not the mobile device 110 is connected to a WiFi hotspot), and the type of connection (e.g., whether or not a WiFi hotspot connection is secured such as requiring a password). The network module 202 receives information generated by the network coprocessor 204 and generates local signals 150 based on the received information. The local signals 150 includes information generated by the network coprocessor 204 (e.g., the status of a network connection) as well as patterns describing network connections (e.g., temporal trends) identified based on the received information. Example patterns include the typical times of day during which the mobile device 110 is connected to a WiFi hotspot, the average speed of a WiFi network connection during the morning, afternoon, and/or evening time periods, and the reliability of a WiFi connection (e.g., the number of times the WiFi connection disconnects within a period of time). The network module 202 provides the local signals 150 and/or information generated by the network coprocessor 204 to other components of the mobile device 110 such as the local ranking model 160, the machine learning module 226, and the training data store 220.

In one embodiment, the GPS coprocessor 204 is a computer hardware processor that maintains information about the geographical location (e.g., GPS longitude and latitude coordinates) of the mobile device 110. The location module 206 receives information maintained by the GPS coprocessor 208 and generates local signals 150 based on the received information. The local signals 150 may include information maintained by the GPS coprocessor 208 as well as patterns (e.g., temporal trends) identified based on the received information. Example patterns include the typical GPS coordinates at which the mobile device 110 is located (e.g., coordinates corresponding to a school or office building) and how long the mobile device 110 remains located within a certain range of GPS coordinates. The location module 206 provides the local signals 150 and/or information maintained by the GPS coprocessor 208 to other components of the mobile device 110 such as the local ranking model 160, the machine learning module 226, and the training data store 220.

In one embodiment, the sensor coprocessor 212 is a computer hardware processor that maintains information about the hardware sensors (e.g., camera, accelerometer, gyroscope, ambient light sensor, microphone, fingerprint sensor, pressure sensor, proximity sensor, and the like) of the mobile device 110. The information may include 3-axis motion data (e.g., acceleration data from the accelerometer and rotation data from the gyroscope), image data from the camera, lighting conditions surrounding the mobile device 110 from the ambient light sensor, and audio data from the microphone. The sensor module 210 receives information maintained by the sensor coprocessor 212 and generates local signals 150 based on the received information. The local signals 150 may include information maintained by the sensor coprocessor 212 as well as patterns (e.g., temporal trends) identified based on the received information. Example patterns include the average level of motion, audio, and ambient lighting during the morning, afternoon, and/or evening time periods. The sensor module 210 provides the local signals 150 and/or information maintained by the sensor coprocessor 212 to other components of the mobile device 110 such as the local ranking model 160, the machine learning module 226, and the training data store 220.

In one embodiment, the application programming interface 214 receives information generated by software applications 216 (e.g., smartphone third-party and/or native apps that provide functions such as messaging, photo sharing, and calendar applications) of the mobile device 110. Examples of generated information include, messages sent by a messaging software application, information identifying other users with whom the user is interacting using the mobile device 110, for example, a phone number of the other user, meta-data associated with a photo taken by a photo sharing software application, and details (e.g., time, location, participants, and RSVP status) of an upcoming event scheduled by a calendar software application. The application programming interface 214 generates local signals 150 based on the received information. The local signals 150 include information maintained by the software applications 216 as well as patterns (e.g., temporal trends) identified based on the received information. Example patterns include a measure of rate of messages communicated by the mobile device, e.g., the average number of text messages sent or received during a particular time interval (e.g., during the morning, afternoon, and/or evening time periods and recurring events scheduled over the period of multiple weeks). The application programming interface 214 provides the local signals 150 and/or information about software applications 216 to other components of the mobile device 110 such as the local ranking model 160, the machine learning module 226, and the training data store 220.

In one embodiment, the memory storage 222 is a hardware memory storage local to the mobile device 110 (or external to and accessible by the mobile device 110, e.g., an external hard drive) such as read-only memory (ROM), random-access memory (RAM), and the like. The memory storage 222 provides information about the data stored on the memory storage 222 to other components of the mobile device 110 such as the local ranking model 160, the machine learning module 226, and the training data store 220. The information includes a status of download of a file, e.g., information indicating whether or not a photo, text, video, or URL link of a news feed story has been downloaded.

In one embodiment, the training data store 220 receives and stores local signals 150 and/or information from the network module 202, location module 206, sensor module 210, application programming interface 214, and memory storage 222. The training data store 220 also receives information received from the user interface 106, the feature extraction module 224, the machine learning module 226, and the social networking system 100.

Figure 5:
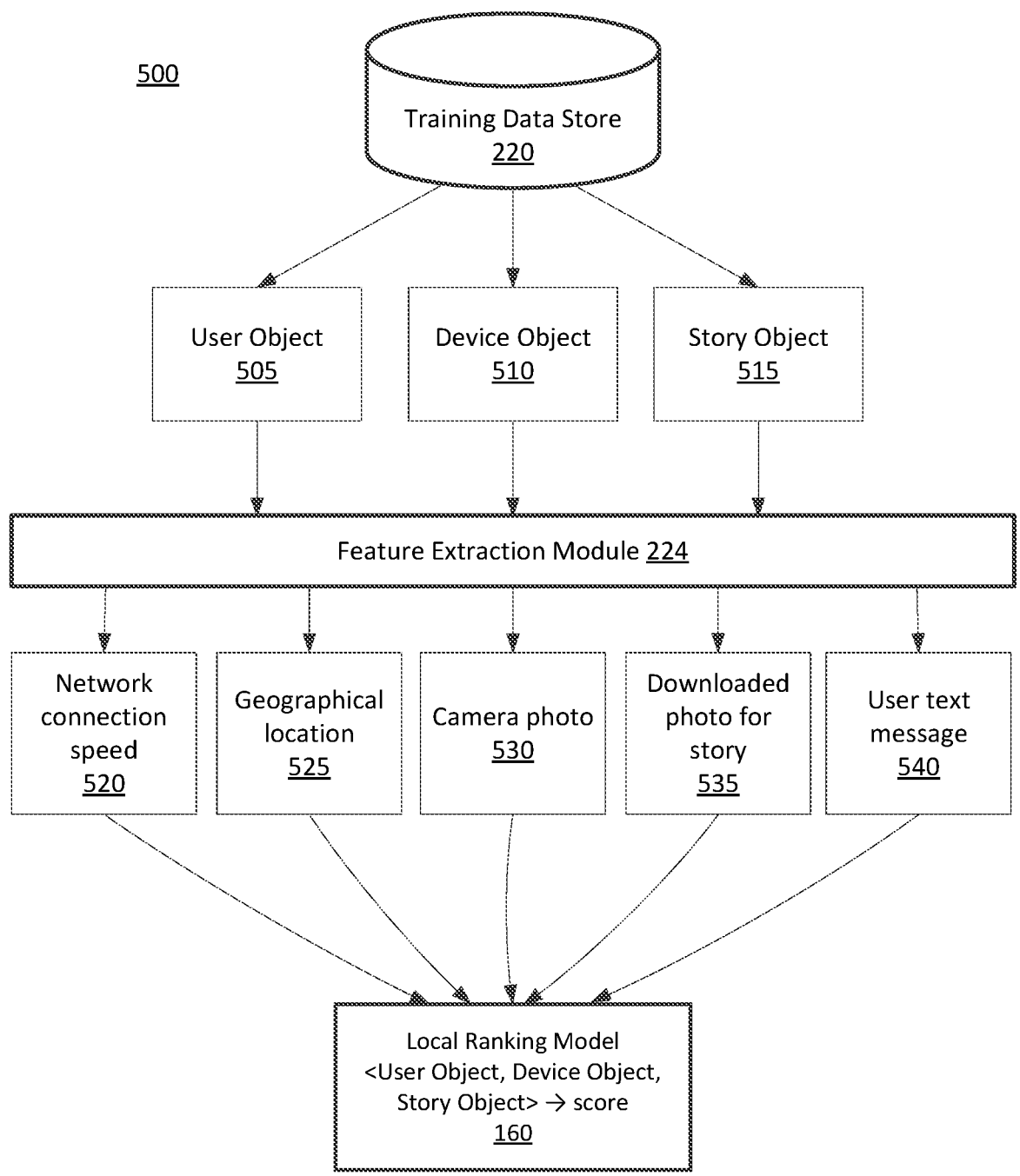
FIG. 5 is a data flow diagram illustrating the interactions between various types of data stored in a social networking system for training a model for ranking news feed stories according to one embodiment.
Figure 6:
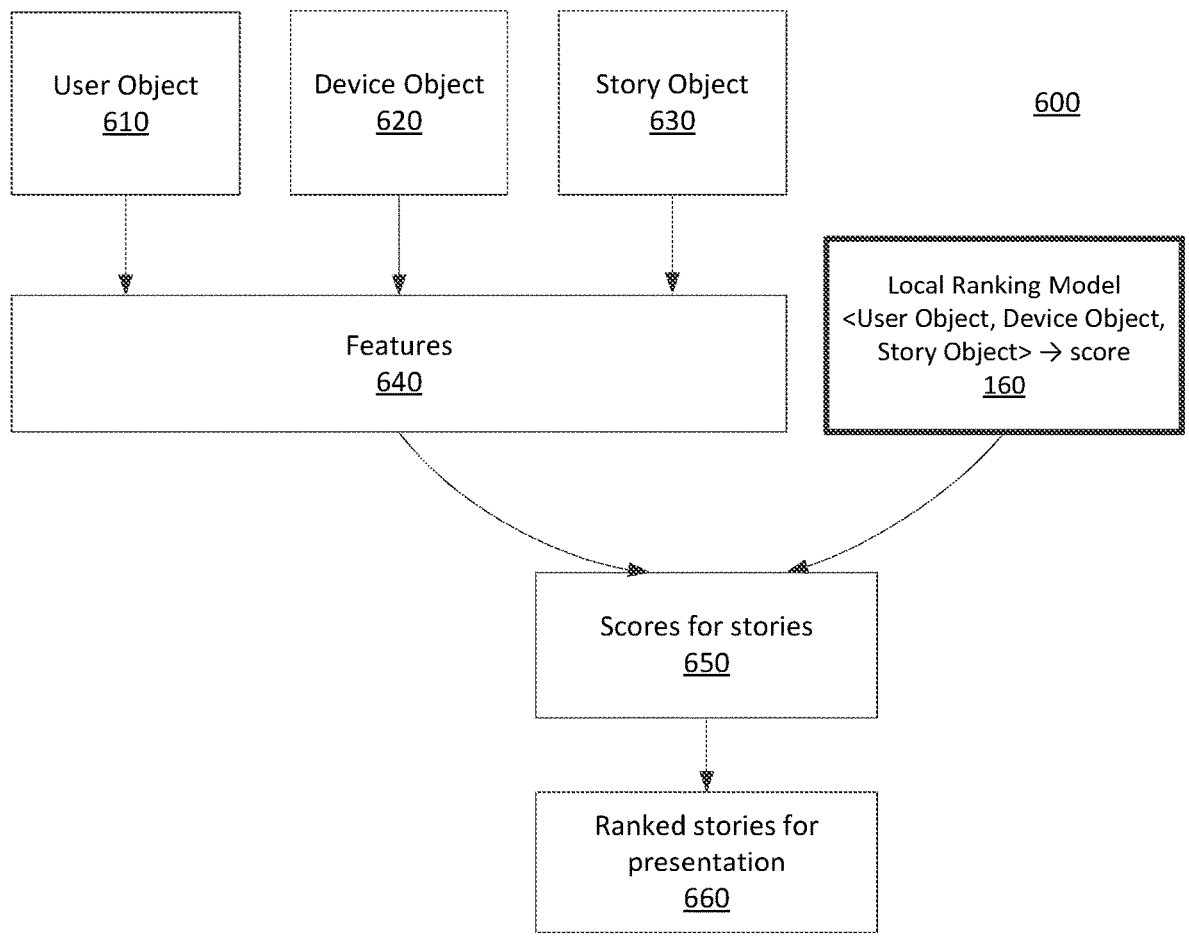
FIG. 6 is a data flow diagram illustrating how to rank news feed stories presented to a user based on local signals according to one embodiment.

In one embodiment, the machine learning module 226 uses machine learning techniques to generate the local ranking model 160, and is further described in FIG. 5 and FIG. 6. In an embodiment, the machine learning module 226 may generate a portion of the functionality invoked by the local ranking model 160. For example, the machine learning module 226 generates a model that modifies a ranking score associated with a given news feed story. The local ranking model 160 can order a set of stories based on the ranking scores of each story. In an embodiment, the machine learning module 226 receives a trained model from the social networking system 100 (e.g., an embodiment of news feed ranking model 104), which is used by the machine learning module 226 to generate the local ranking model 160.

The machine learning module 226 may generate a model based on optimization of different types of ranking models, including but not limited to algorithms that analyze individual stories separately, pairs of stories, or sets of stories. For example, the machine learning module 226 may generate a classifier, saved in the training data store 220, that takes as input a pair of news feed stories for a given user and returns true if the first news feed story ranks higher than the second news feed story for reporting to the user and false otherwise. The local ranking model 160 can use the output of the generated classifier to rank a given set of news feed stories by doing pair wise comparisons of the ranking scores of the stories. Other embodiments can use other machine learning techniques for ranking news feed stories, for example, tree-based models, kernel methods, neural networks, splines, or an ensemble of one or more of these techniques.

In one embodiment, the feature extraction module 224, further described in FIG. 5, extracts various features from the local signals 150 and information about the mobile device 110 and features from news feed stories that are used as input for the local ranking model 160. The feature extraction module 224 stores the extracted features in the training data store 220 and may run in a batch mode to process data stored in the training data store 220. Alternatively, the feature extraction module 224 may extract the features on a need basis upon invocation by the local ranking model 160. This ensures that the news feed ranking model 160 is provided with the recent most information. The feature extraction module 224 can store the extracted features in the training data store 220 to ensure that the effort of extracting the features is not duplicated. For example, the feature extraction module 224 may store a time stamp along with the features to determine when the information was generated and whether it needs to be regenerated or not.

In one embodiment, the news feed stories store 218 receives and stores stories received from the social networking system 100. The received stories (e.g., ranked stories 140A) each have a ranking score. The local ranking model 160 determines whether or not to modify ranking scores of the received stories based on local signals 150 of the mobile device 110, which is further described in FIG. 3A through FIG. 6.

Ranking Based on Local Signals

Figures 3A, 3B:
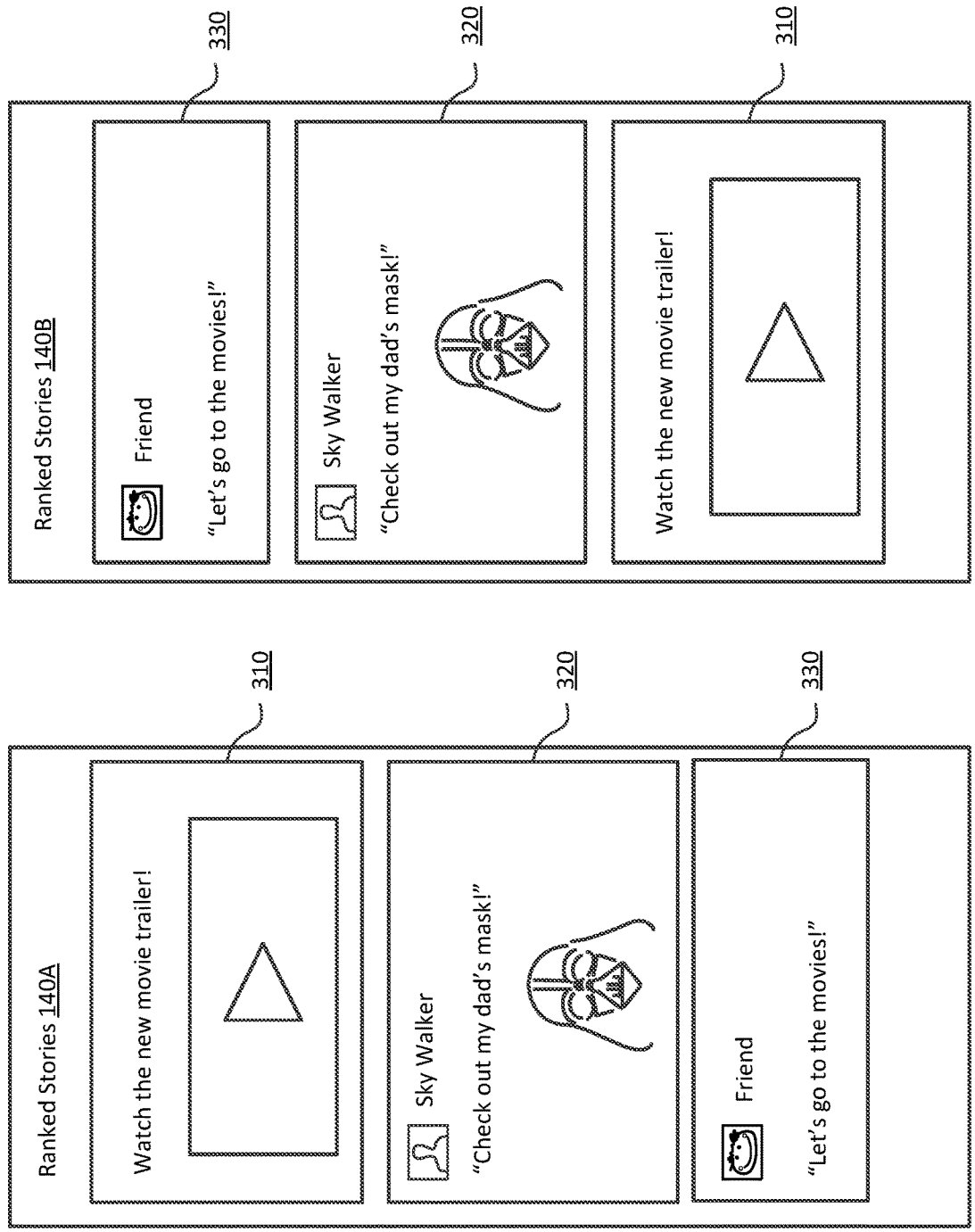
FIG. 3A shows ranked news feed stories according to one embodiment.
FIG. 3B shows the same news feed stories of FIG. 3A, but ranked in a different order according to one embodiment.

FIG. 3A shows ranked news feed stories according to one embodiment. In the example shown in FIG. 3A, the ranked stories 140A received by the mobile device 110 from the system 100 includes a story 310 with a video, a story 320 with a photo, and a story 330 with only text. The story 310 is displayed above the story 320 because the system 100 ranked the story 310 with a higher ranking score than that of the story 320. Similarly, the story 320 is displayed above the story 330 because the system 100 ranked the story 320 with a higher ranking score than that of the story 330. In one embodiment, the video of the story 310 is previously saved on local memory of the device 110.

FIG. 3B shows the same news feed stories of FIG. 3A, but ranked in a different order within the environment of FIG. 1 according to one embodiment. Following from the same example in FIG. 3A, the same three stories have been re-ranked (e.g., by modifying ranking scores of the stories) by the local ranking model 160 based on local signals 150 of the mobile device 110. In this instance, the mobile device 110 has a weak network connection, as determined by the network module 202 based on information received from the network coprocessor. Thus, stories with multimedia content are ranked lower than stories with only text. The local ranking module 160 receives the stories with story 330 originally ranked with a ranking score lower than that of story 320. The local ranking module 160 re-ranks the stories such that story 330 has a ranking score higher than that of both story 320 and story 310. Therefore, the user interface 106 displays the story 330 on the top of the ranked stories 140B for presentation on a news feed of the mobile device 110. The user interface 106 displays story 320 between story 330 and story 310 because the ranking score of story 320 is between those of story 330 and story 310. In other embodiments, the news feed stores store 218 aggregates the ranked stories received from the system 100 with stories already stored on the mobile device 110, e.g., stories previously displayed on the mobile device 110 but not viewed and/or completely viewed by a user of the mobile device (e.g., the user read the text of the story but did not view a photo of the story). The ranking scores of aggregated stories may be modified by the local ranking model 160 such that newly received stories may be displayed above stories previously displayed on a user's news feed of the mobile device 110.

Typically, the social networking system sends the news feed stories for presentation to the user as and when new news feed stories are generated. New news feed stories are generated when connections of the user perform actions. For example, a connection may post an image and a user may post a comment associated with the image posted. Both, the activities of posting the image as well as commenting on the image can generate stories. Other stories include activities, for example, a connection of the user adding a new connection.

Some stories may be based on information that is not associated with a specific action performed by a user but may be relevant to multiple users of the social networking system. For example, information describing a new feature offered by the social networking system 100 may be determined to be of interest to all users and sent to them as a story. Some features added to the social networking system may be determined to be of interest only to a set of users. For example, a story reporting a new game added to the social networking system 100 may be presented to users that have indicated interest in similar games. Similarly, news feed stories associated with entities represented in the social networking system including events or social groups may be reported to multiple users that are determined to be interested in the entity.

Figures 4A, 4B:
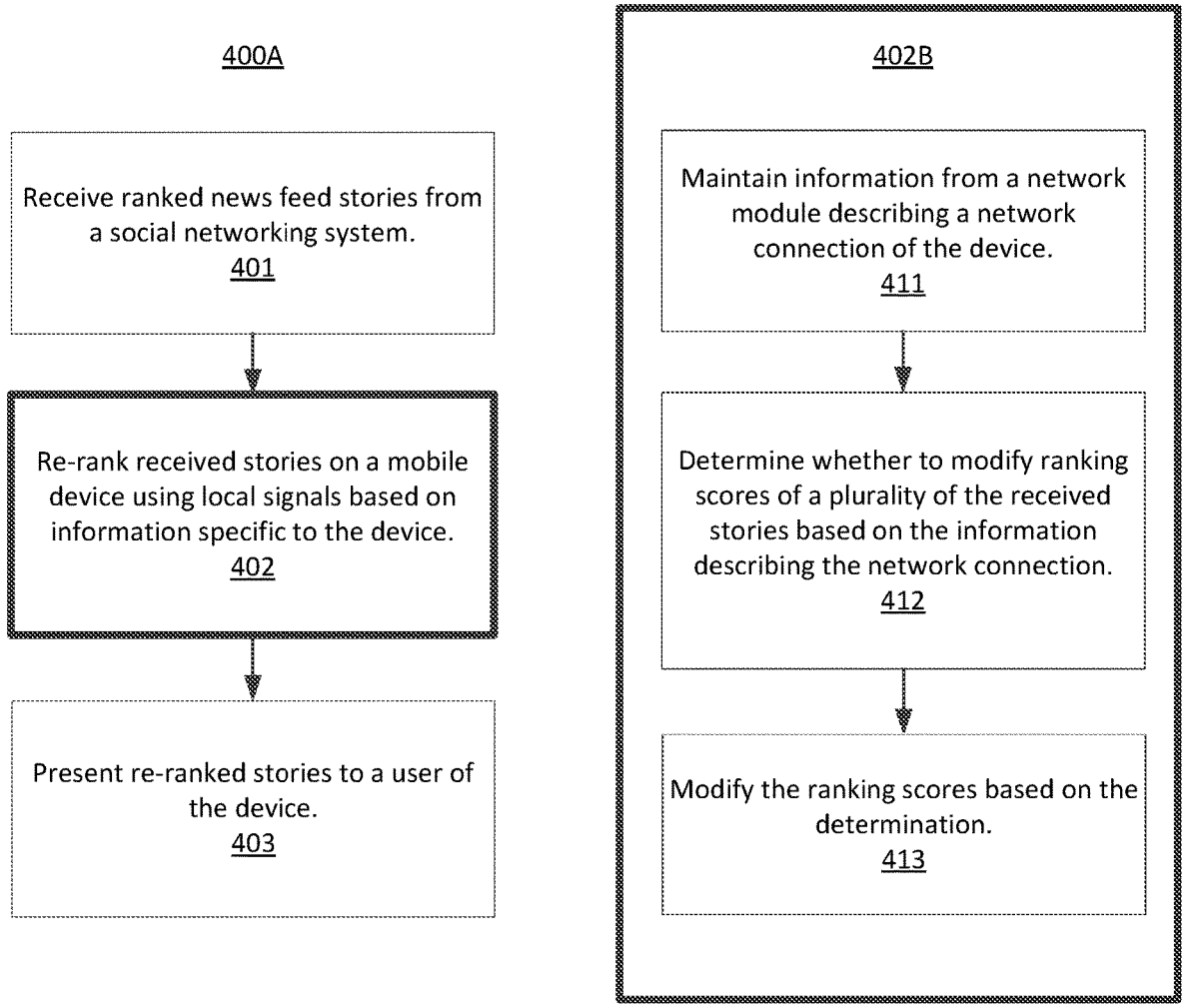
FIG. 4A is a flowchart of the process of presenting news feed stories on a client device within the social networking system environment of FIG. 1 according to one embodiment.
FIG. 4B is a flowchart of the process of ranking news feed stories based on network connection information of a mobile device according to one embodiment.

FIG. 4A is a flowchart of the process 400A of presenting news feed stories on a client device within the social networking system environment of FIG. 1 according to one embodiment. The process 400A may include different or additional steps than those described in conjunction with FIG. 4A in some embodiments or perform steps in different orders than the order described in conjunction with FIG. 4A. The mobile device 110 receives 401 ranked news feed stories from the system 100. Next, the local ranking model 160 re-ranks 402 the received stories using local signals 150 based on information specific to the device 110 (e.g., information from the network module 202, location module 206, sensor module 210, application programming interface 214, and memory storage 222), which is further described in FIG. 4B through FIG. 4F. Finally, the mobile device 110 presents 403 the stories to a user of the device 110 via the user interface 106. The stories are presented 403 when the user is actively engaging with the user interface 106, though the re-ranking 402 may be completed either when the user is or is not actively engaging with the user interface 106. For example, if the mobile device 110 is the user's smartphone in the user's pocket while the user is travelling on a train for an hour, the stories may be re-ranked 402 multiple times during the duration of the user's trip. In the same instance, during the user's trip, local signals 150 of the mobile device 110 may change over time.

Ranking Based on Network Connection

FIG. 4B is a flowchart of the process 402B of ranking news feed stories based on network connection information of a mobile device 110 according to one embodiment. The process 402B may include different or additional steps than those described in conjunction with FIG. 4B in some embodiments or perform steps in different orders than the order described in conjunction with FIG. 4B. The mobile device 110 maintains 411 local signals 150 and/or information from a network module 202 describing the network connection of the device 110. Next, the local ranking model 160 determines 412 whether or not to modify the ranking scores of a plurality of the received ranked stories from the system 100 based on the local signals 150 and/or information describing the network connection. Finally, the local ranking model 160 modifies 413 the ranking scores of the plurality of stories based on the determination.

In an example use case, if there is poor or no network connection available on the device 110, then the local ranking model 160 decreases the ranking scores of stories that require a network connection to complete an action. For instance, a story that contains a URL to an external website is ranked lower because a user will not be able to access the external website without a network connection. In another example, stories with an attachment (e.g., a document and/or a media object such as a video, audio, or image) may be ranked lower when the download speed of the network connection is slow or when the network connection is unreliable (e.g., erratically changes download speed or frequently drops the connection). That is, downloading the content of the attachment (e.g., for playing a video) with a poor network connection provides a poor user experience as result of frequent buffering and pauses due to the slow download speed. In a different example, the local ranking model 160 uses patterns from the local signals 150 to modify ranking scores. In particular, the local ranking model 160 uses the patterns to predict future local signals and/or durations of local signals based on previously received local signals over time. For instance, if a local signal 150 indicates that the device 110 typically has a fast and reliable network connection in the evenings (e.g., a user is at home where she has a high-speed WiFi internet plan installed), then stories with multimedia may be ranked higher in the evening than in the morning or afternoon time periods. The local ranking model 160 may modify the ranking scores of stories based on different weights associated with different rules related to the network connection of the device 110. For example, a local signal indicating no network connection may be associated with a higher weight compared to a local signal indicating a slow download speed.

Ranking Based on Location

Figure 4C:
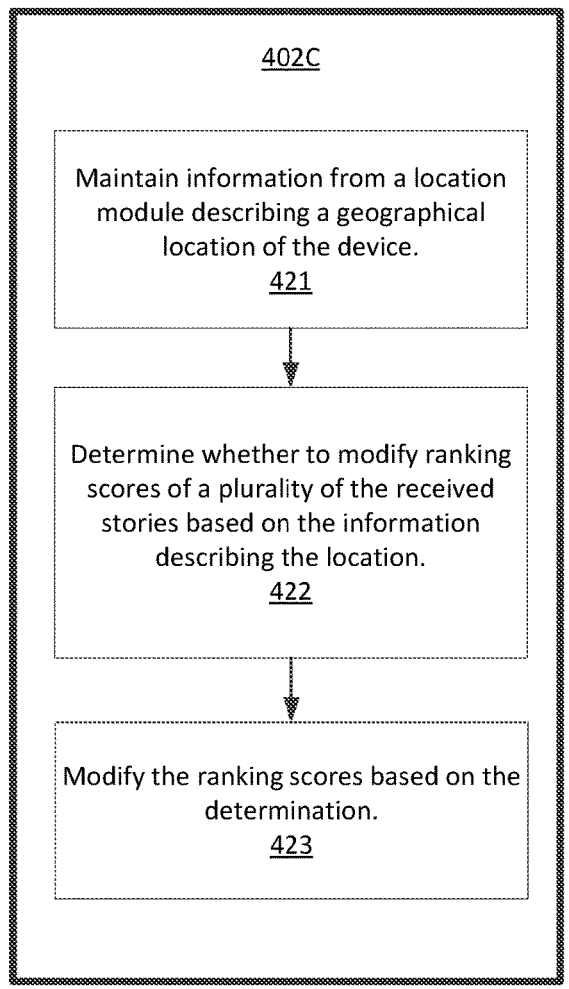
FIG. 4C is a flowchart of the process of ranking news feed stories based on geographical location information of a mobile device according to one embodiment.

FIG. 4C is a flowchart of the process 402C of ranking news feed stories based on geographical location information of a mobile device 110 according to one embodiment. The process 402C may include different or additional steps than those described in conjunction with FIG. 4C in some embodiments or perform steps in different orders than the order described in conjunction with FIG. 4C. The mobile device 110 maintains 421 local signals 150 and/or information from a location module 206 describing the geographical location of the device 110. Next, the local ranking model 160 determines 422 whether or not to modify the ranking scores of a plurality of the received ranked stories from the system 100 based on the local signals 150 and/or information describing the geographical location. Finally, the local ranking model 160 modifies 423 the ranking scores of the plurality of stories based on the determination.

In an example use case, if the device 110 is geographically located near or at a live event (e.g., sports game, music concert, robotics competition, presidential election debate, etc.), then the local ranking model 160 increases the ranking scores of stories that are associated with the live event. For instance, a story including a text comment and/or multimedia about a player of a basketball team will be ranked higher if the device 110 is at a stadium where the player is currently playing a basketball game. In another example, if a device 110 is located in a shopping mall, then stories with content related to products sold at malls will be scored higher. For instance, a story with sponsored content for women's clothing such as a promotional offer may be scored higher such that a user at the mall will view the story displayed near or at the top of her news feed on the device 110. In a different example, the local ranking model 160 uses patterns from the local signals 150 to modify ranking scores. For instance, if a local signal 150 indicates that the device 110 is typically located near a gym around 7 PM, then stories related to exercise, diet, and fitness may be ranked higher around 7 PM than in other time periods during the day. The local ranking model 160 may modify the ranking scores of stories based on different weights associated with different rules related to the geographical location of the device 110. For example, a rule may depend on the distance between the device 110 and a live event, e.g., a location within a one-mile radius of a live event is associated with a heavier weight than a location within a five-mile radius from the live event because the device 110 is further away from the live event, and thus a user of the device 110 is less likely to attend the live event.

Ranking Based on Sensors

Figure 4D:
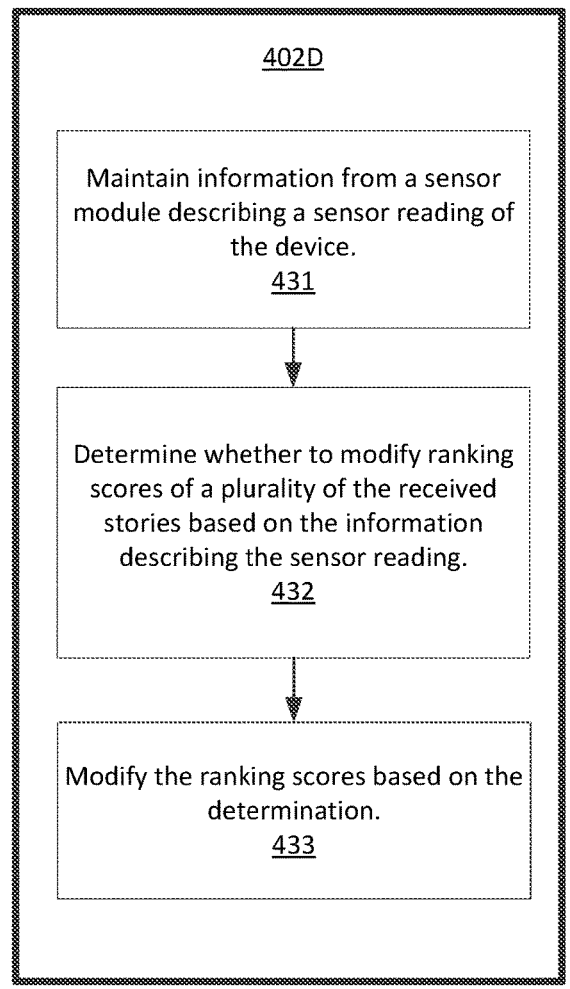
FIG. 4D is a flowchart of the process of ranking news feed stories based on hardware sensor information of a mobile device according to one embodiment.

FIG. 4D is a flowchart of the process 402D of ranking news feed stories based on hardware sensor information of a mobile device 110 according to one embodiment. The process 402D may include different or additional steps than those described in conjunction with FIG. 4D in some embodiments or perform steps in different orders than the order described in conjunction with FIG. 4D. The mobile device 110 maintains 431 local signals 150 and/or information from a sensor module 210 describing a sensor reading (or sensor readings) of the device 110. Next, the local ranking model 160 determines 432 whether or not to modify the ranking scores of a plurality of the received ranked stories from the system 100 based on the local signals 150 and/or information describing the sensor readings. Finally, the local ranking model 160 modifies 433 the ranking scores of the plurality of stories based on the determination.

In an example use case, if the accelerometer and gyroscope sensors of a device 110 indicate the a user is likely exercising (e.g., the motion of the device 110 resembles the motion of a person running), then the local ranking model 160 increases the ranking scores of stories that are associated with sports and exercising. In another example, the device 110 uses voice recognition algorithms, known to one skilled in the art, on the audio data recorded by the microphone to modify ranking scores. In some embodiments, the local ranking model 160 uses patterns from the local signals 150 to modify ranking scores. The local ranking model 160 may modify the ranking scores of stories based on different weights associated with different rules related to the hardware sensor readings of the device 110. For example, audio data from the microphone is associated with a heavier weight than ambient light sensor data.

Ranking Based on Downloaded Data

FIG. 4E is a flowchart of the process 402E of ranking news feed stories based on memory storage information of a mobile device 110 according to one embodiment. The process 402E may include different or additional steps than those described in conjunction with FIG. 4E in some embodiments or perform steps in different orders than the order described in conjunction with FIG. 4E. The mobile device 110 maintains 441 local signals 150 and/or information from memory storage 222 describing the downloaded data on the device 110. Next, the local ranking model 160 determines 442 whether or not to modify the ranking scores of a plurality of the received ranked stories from the system 100 based on the local signals 150 and/or information describing the downloaded data. Finally, the local ranking model 160 modifies 443 the ranking scores of the plurality of stories based on the determination.

In an example use case, if a story contains both text and a photo, but the photo has not been completely downloaded to the device 110 while the text has been completely downloaded, then the local ranking model 160 lowers the ranking score of the story because a user will not be able to view the photo while reading the text. In this same example, once the photo has been completely downloaded at a future time, then the story may be re-ranked with a higher score. In another example, stories with a URL to a third party webpage will be ranked higher if the device 110 has already downloaded the first page of text of the webpage because a user who follows the URL will not have to wait as long for the webpage to load and be ready to view. Similarly in another example, stories with a video will be ranked higher if the device 110 has already downloaded the first several seconds of the video because a user who plays the video will not have to wait as long for the start of the video to be ready to view. The local ranking model 160 may modify the ranking scores of stories based on different weights associated with different rules related to the memory storage 222 of the device 110. For example, downloading a photo of a story may be associated with a weight of 1, while downloading the first page of text of a webpage linked in a story may be associated with a lighter weight of 0.1.

Ranking Based on Information Generated by Software Applications

FIG. 4F is a flowchart of the process 402F of ranking news feed stories based on software application information of a mobile device 110 according to one embodiment. The process 402F may include different or additional steps than those described in conjunction with FIG. 4F in some embodiments or perform steps in different orders than the order described in conjunction with FIG. 4F. The mobile device 110 maintains 451 local signals 150 and/or information from an application programming interface 214 describing a software application 216 (or software applications 216) running on the device 110. Next, the local ranking model 160 determines 452 whether or not to modify the ranking scores of a plurality of the received ranked stories from the system 100 based on the local signals 150 and/or information describing the software application 216. Finally, the local ranking model 160 modifies 453 the ranking scores of the plurality of stories based on the determination.

In an example use case, the device 110 determines, based on information from a third party software application via the application programming interface 214, that a first user frequently interacts with a second user of the social networking system 100 in the third party software application (the first user and the second user may be connected on the social networking system 100 as friends). For instance, the first user interacts with the second user using a third party software application that allows sending messages. In this example, the local ranking model 160 increases the ranking scores of stories related to the second user for presentation on the first user's device and also increases the ranking scores of stories related to the first user for presentation on the second user's device. In a different example, the local ranking model 160 uses patterns from the local signals 150 to modify ranking scores. For instance, if a local signal 150 from the application programming interface 214 indicates that the user of the device 110 typically schedules, from a third party software application with calendar functionality, the same type of event and/or activity at a certain time of day, then stories related to the event and/or activity may be ranked higher during that time of day. In another example, a local signal 150 from the application programming interface 214 indicates that the user of the device 110 typically shares, from a photo-sharing software application, photos related to one or more themes (e.g., "sports" or "travelling") based on meta-data associated with the photos; in this case, stories related to the one or more themes are ranked higher. The local ranking model 160 may modify the ranking scores of stories based on different weights associated with different rules related to the software applications running on the device 110. For example, information from ride sharing software applications may be associated with a heavier weight than information from calendar software applications.

In one embodiment, the local ranking model 160 may modify the ranking scores of stories based on aggregating multiple weights associated with different local signals 150 and/or information from the network module 202, location module 206, sensor module 210, application programming interface 214, and memory storage 222 of the device 110. For example, local signals 150 based on information from the network module 202 may be associated with a heavier weight than local signals 150 based on information from the location module 206.

Machine Learning Model

FIG. 5 is a data flow diagram 500 illustrating the interactions between various types of data stored in a social networking system 100 for training a local ranking model 160 for ranking news feed stories according to one embodiment. The machine learning module 226 retrieves, from the training data store 220, information describing users of the social networking system 100 from user objects 505, information describing the device 110 from device objects 510, and information describing news feed stories from story objects 515. The machine learning module 226 invokes the feature extraction module 224 to extract features from the user objects 505, device objects 510, and story objects 515. The features extracted may be associated with individual objects or with interactions between objects. As shown in FIG. 5, the features extracted include, for example, features based on a network connection speed 520, geographical location 525, camera photo 530, downloaded photo for a story 535, and user text message 540. The machine learning model 226 trains the local ranking model 160 based on the extracted features. In an embodiment, the local ranking model 160 generates a score for ranking a story for a user of a device when presented with a corresponding story object 515, user object 510, and device object 510. The model 160 generates the score based on attributes of the story identified by the story object 515, attributes of the user identified by the user object 510, and attributes of the device identified by the device object 510. In one embodiment, the machine learning model 226 periodically retrains the local ranking model 160 at a determined frequency of time. The frequency of time may be based on local signals and/or information from the device 110 such as the average time a user engages with news feed stories on the device 110 per day.

FIG. 6 is a data flow diagram 600 illustrating how to rank news feed stories presented to a user 120 of a mobile device 110 based on local signals 150 according to one embodiment. As shown in FIG. 6, the local ranking model 160 trained by the machine learning module 226 is used to rank the news feed stories presented to the user 120. If the features 640 of the user 120, the device 110, and the stories (e.g., from user objects 610, device objects 620, and story objects 630, respectively) were previously extracted and stored in the training data store 220, the machine learning module 226 retrieves the stored features 640. If the features 640 were not extracted, the feature extraction module 224 may extract the features 640 and store them in the training data store 220 to allow the machine learning module 226 to retrieve the features 640.

In one embodiment, the machine learning module 226 invokes the local ranking model 160 using the extracted features 640. The local ranking model 160 provides the scores 650 for stories in a set of stories selected for presentation to the viewer. The local ranking model 160 then ranks the stories (e.g., modifying the ranking scores of the stories) based on their scores 650 and obtains a set 660 of ranked stories for presentation. The model 160 provides the ranked set of stories for presentation to the viewer via the user interface 106 on the device 110.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a local device from a social networking system, a plurality of news feed stories and an initial ranking score for each of the news feed stories that is determined by the social networking system;
    retrieving, by the local device, local information associated with the local device, the local information generated by local hardware associated with the local device;
    determining, by the local device, whether to modify the initial ranking score of at least one story of the plurality of news feed stories based on the retrieved local information and an attribute associated with the at least one story;
    modifying, by the local device, the initial ranking score of the at least one story based on the determination;
    ranking, by the local device, the plurality of news feed stories based on the modified ranking score of the at least one story and the initial ranking scores of the other news feed stories; and
    displaying, on the local device, the plurality of news feed stories in an order determined based on the ranking.

2. The method of claim 1, wherein receiving, by the local device from the social networking system, a plurality of news feed stories comprises:
    receiving one or more news feed stories from a server of the social networking system;
    receiving one or more news feed stories stored in a hardware memory storage of the local device; and
    combining the one or more news feed stories obtained from the server of the social networking system with the one or more news feed stored in the hardware memory storage of the local device to obtain the plurality of news feed stories.

3. The method of claim 1, wherein the attribute associated with the at least one story represents a measure of size of data of the at least one story.

4. The method of claim 1, wherein the attribute associated with the at least one story describes a type of multimedia included in the at least one story.

5. The method of claim 1, further comprising training a model configured to modify initial ranking scores of news feed stories, the training utilizing training data sets obtained from the local device, wherein features used for the model comprise information generated by the local hardware associated with the local device, wherein determining whether to modify the initial ranking score of the at least one story of the plurality of news feed stories is further based on the trained model.

6. The method of claim 5, wherein the model is periodically retrained at a rate determined based on interactions performed by a user on the local device.

7. The method of claim 1, wherein the local hardware is a first local hardware, the method further comprising:
    retrieving, by the local device, additional local information generated by a second local hardware associated with the local device,
    wherein determining whether to modify the initial ranking score of the at least one story of the plurality of news feed stories is further based on a weighted average of values associated with the local information generated by the first local hardware and the additional local information generated by the second local hardware.

8. The method of claim 1, wherein retrieving, by the local device, the local information associated with the local device comprises retrieving, from a global positioning system (GPS) coprocessor, information describing a geographical location of the local device, wherein modifying the initial ranking score of the at least one story comprises increasing the initial ranking score of the at least one story responsive to determining that the at least one story is associated with the geographical location of the local device.

9. The method of claim 1, wherein retrieving, by the local device, the local information associated with the local device comprises retrieving, from a memory storage hardware of the local device, information describing data downloaded to the memory storage hardware, wherein the data downloaded to the memory storage hardware is a portion of a content item associated with the at least one story.

10. The method of claim 9, wherein modifying the initial ranking score of the at least one story comprises increasing the initial ranking score of the at least one story responsive to determining that a download of the content item associated with the at least one story is completed.

11. The method of claim 1, wherein retrieving, by the local device, the local information associated with the local device comprises retrieving, from a hardware sensor, information describing a sensor reading of the local device.

12. The method of claim 11, wherein the hardware sensor is an ambient light sensor and the sensor reading describes the ambient lighting conditions surrounding the local device, and wherein determining whether to modify the initial ranking score of the at least one story of the plurality of news feed stories is further based on the ambient lighting conditions.

13. The method of claim 11, wherein the hardware sensor is an accelerometer and the sensor reading describes one or more axis of acceleration of the local device, and wherein determining whether to modify the initial ranking score of the at least one story of the plurality of news feed stories is further based on the one or more axis of acceleration.

14. The method of claim 11, wherein the hardware sensor is a gyroscope and the sensor reading describes one or more axis of rotation of the local device, and wherein determining whether to modify the initial ranking score of the at least one story of the plurality of news feed stories is further based on the one or more axis of rotation.

15. The method of claim 11, wherein the hardware sensor is a microphone and the sensor reading describes audio data recorded by the local device, and wherein determining whether to modify the initial ranking score of the at least one story of the plurality of news feed stories is further based on the audio data.

16. The method of claim 11, wherein the hardware sensor is a camera and the sensor reading describes a photo taken by the local device, and wherein determining whether to modify the initial ranking score of the at least one story of the plurality of news feed stories is further based on the photo.

17. A computer-implemented method comprising:
receiving, by a local device from a social networking system, a plurality of news feed stories and an initial ranking score for each of the news feed stories that is determined by the social networking system;
retrieving, by the local device, local information generated by a third party software application running on the local device, the third party software application located outside the domain of the social networking system;
determining, by the local device, whether to modify the initial ranking score of at least one story of the plurality of news feed stories based on the retrieved local information and an attribute associated with the at least one story;
modifying, by the local device, the initial ranking score of the at least one story based on the determination by inputting into a trained model features that comprise information generated by the third party software application running on the local device, the model trained based on training data sets obtained from the local device;
ranking, by the local device, the plurality of news feed stories based on the modified ranking score of the at least one story and the initial ranking scores of the other news feed stories; and
displaying, on the local device, the plurality of news feed stories in an order determined based on the ranking.

18. The method of claim 17, wherein determining whether to modify the initial ranking score of at least one story of the plurality of news feed stories is further based on the trained model.

19. The method of claim 17, wherein the model is periodically retrained at a rate determined based on interactions performed by the user on the local device.

\* \* \* \* \*